ns of the esters of toluic acids, whereby a high and entirely unexpected yield of the esters of phthalic acids is produced.

United States Patent Office 3,253,017
Patented May 24, 1966

3,253,017
PROCESS FOR THE PRODUCTION OF ESTERS OF PHTHALIC ACIDS
Ewald Katzschmann, Dortmund-Kruckel, Germany, assignor to Chemische Werke Witten, Witten (Ruhr), Germany
No Drawing. Filed Apr. 26, 1960, Ser. No. 24,680
Claims priority, application Germany, May 9, 1959, C 18,967
8 Claims. (Cl. 260—475)

The present invention relates to the production of esters of phthalic acids and, more particularly, to the production of esters of phthalic acids from mixtures of xylene and esters of toluic acids by oxidation in the liquid phase.

It is an object of the present invention to provide an improved, simplified and highly advantageous process of producing esters of phthalic acids by oxidation of xylene in mixture with esters of toluic acids, whereby the formation of undesirable by-products is considerably reduced.

It is a further object of the present invention to provide an improved, simplified process for the production of esters of phthalic acids by oxidation of xylene in mixture with esters of toluic acids, whereby a high and entirely unexpected yield of the esters of phthalic acids is produced.

Other objects of the present invention and advantageous features thereof will become apparent as the description proceeds.

The present invention is an improvement over the process illustrated in my prior U.S. Patent No. 2,894,978 which relates to a process for the production of benzene dicarboxylic acid esters by the joint catalytic oxidation of xylenes or their isomeric mixtures and the esters of toluic acids, resulting therefrom by oxidation, in the liquid phase with oxygen-containing gases in the presence of oxidation catalysts.

The process according to U.S. Patent No. 2,894,978 consists in using, as the starting material, a mixture of xylenes and esters of toluic acids with alkanols having 1 to 4 carbon atoms in the proportion by weight between 1:3 and, at the most, 1:1. The mixture is oxidized by means of oxygen or oxygen-containing gases, such as air, at a temperature between about 80° C. and about 250° C., preferably between 140° C. and about 160° C., at ordinary or increased pressure for a prolonged period of time, at least for about 4 hours. Thereby, first all the xylenes are converted into toluic acid. At the same time, the toluic acid esters present in the starting mixture are, at least partially, oxidized to phthalic acid monoesters. The resulting toluic acids suffer intermediarily an ester radical interchange reaction with the phthalic acid monoesters formed on said oxidation so that toluic acid esters are produced. Oxidation catalysts may be used in the oxidation reaction.

It is possible to conduct the oxidation process of this patent in such a manner that, when the desired degree of oxidation is reached, practically no xylene will be present in the oxidation mixture. Additionally, the oxidation may be carried out so that, during the oxidation, xylene is added wholly or partly to the toluic acid esters. The oxidation and the esterification can be conducted continuously in a conventional manner according to the counterflow principle in a reaction tower or in a series of oxidation vessels.

Specific examples of illustrative starting materials used in the patent are a mixture of 96% p-xylene and pure or technical grade methyl ester of p-toluic acid. Equal molecular amounts of o-xylene or m-xylene and of the methyl esters of o-toluic acid or m-toluic acid may be used. Likewise, a mixture of xylenes, such as a commercial product containing, for instance, 66% of m-xylene, 33% of p-xylene, and the remainder being o-xylene and ethyl benzene, as well as mixture of the methyl esters of m-toluic acid and p-toluic acid with small amounts of o-toluic acid may also be employed as starting materials.

It has now been found that an unobvious and unexpected result in the production of iso- or terephthalic acid dimethyl ester is obtained when 98.5 to 100% p- or m-xylene is utilized. The use of such xylenes is particularly effective in restricting the formation of by-products. In addition thereto, the yield is high and entirely unexpected when compared to the theoretical yield and the space/time yield.

The improvement in the oxidation products as a consequence of the use of the xylene concentration proposed by the present invention is all the more surprising as it was known that no improved yields could be realized with a mixed xylene with, for example, 25% p-xylene and with a mixed xylene with, for example, 90% p-xylene. The data given below explain the use of xylene according to the present invention with the afore-mentioned concentrations compared to the heretofore utilized xylenes.

By the joint oxidation of, for example, p-xylene and p-toluic acid methyl ester, terephthalic acid dimethyl ester was obtained. An initial mixture of 15 kg. p-xylene and 30 kg. p-toluic acid methyl ester was oxidized for 18 hours at 140° C., while 2 liters/min./kg. of air were passed therethrough. The oxidation reaction was carried out in the presence of an oxidation catalyst—a cobalt salt of a fatty acid—and at a pressure of 1.5 atmospheres. The resulting oxidate was esterified under pressure with methanol. The terephthalic acid dimethyl ester obtained thereby was isolated and the residual ester made up with p-xylene to 45 kg. and further oxidized. This operation was carried out 10 times. Under completely identical conditions, the following starting materials were used:

*Concentration of p-xylene*

| Designation | (a) 95.5% | (b) 96.4% | (c) 98.5% | (d) 99.4% | (e) 100% |
|---|---|---|---|---|---|
| Median (average) acid number of the oxidates | 256 | 258 | 262 | 268 | 265 |
| Median saponification number of the oxidates | 510 | 505 | 506 | 512 | 510 |
| Dimethyl terephthalic acid ester theoretical yield (in percent) | 82.0 | 83.0 | 88.5 | 91.0 | 94.5 |
| Dimethyl terephthalic acid ester yield—space/time per kg./hr | 0.93 | 0.96 | 1.05 | 1.14 | -------- |
| Percent by-products with respect to dimethyl terephthalic acid ester | 5.22 | 5.12 | 4.86 | 3.74 | 2.72 |

The same results are obtained when m-xylene is utilized, whereas no dependence upon the concentration can be ascertained when o-xylene is used in the same concentrations.

The utilization of xylenes in concentrations of from 98.5 to 100% is of particular significance or value for the end product with regard to the minimization of by-products and the production of polyesters, since the substantial decrease in the formation of by-products and the increase of the theoretical yield due to the increase of the concentration of p- or m-compounds finds a special interest technically.

Esterification of the oxidation mixture may also be effected by refluxing the oxidation mixture with an excess of methanol and with the addition of hydrochloric acid or other conventional esterification catalysts, whereby the water produced during esterification is continuously removed from the distillate while the methanol is returned into the reaction vessel.

In the place of the catalyst used in the preceding example, other catalysts, such as cobaltous and manganous caproate, caprylate, caprinate, laurate and the like may be employed. The concentration of the catalyst used is comparatively low and usually within the range of about 0.001% to about 0.1% cobalt or manganese metal based on the total weight of the reaction mixture.

Of course, many changes and variations in the proportions of the xylene and lower alkyl esters of toluic acid in the starting mixture; in the reaction conditions, such as temperature, pressure and duration; in the catalysts used; in the methods of esterifying the oxidation mixture and of separating the resulting esters; in the manner in which the esterified oxidation mixture is purified, and the like, may be made by those skilled in the art in accordance with the principles set forth herein and the claims annexed hereto.

Although the methyl esters of toluic acids are especially suitable for the oxidation process of the present invention, it is also possible to use other esters of said acids, for instance, the esters with ethanol, n-propanol, isopropanol, n-butanol, isobutanol and tertiary-butanol. Likewise, esterification of the oxidation mixture, after oxidation is completed, may be carried out with such other lower alkanols. The procedure is, in general, the same as that described above.

I claim:
1. In a process for producing esters of phthalic acids from mixtures of xylene and esters of toluic acids with monovalent alkanols, the steps which comprise oxidizing a mixture of a xylene selected from the group consisting of p-xylene having a concentration of at least 98.5% and m-xylene having a concentration of at least 98.5% and esters of toluic acids with alkanols in the proportion by weight between about 1:3 and, at the most 1:1 in the liquid phase with an oxygen-containing gas at a temperature between about 80° C. and about 250° C. in the presence of an oxidation catalyst for a prolonged period of time until the xylenes are substantially completely oxidized.

2. The process according to claim 1, wherein oxidation is carried out between about 140° C. and about 160° C.

3. The process according to claim 1, wherein oxidation is carried out under pressure.

4. The process according to claim 1, wherein a mixture of p-xylene having a concentration of at least 98.5% and the methyl esters of toluic acids is used as the starting material.

5. A process according to claim 1, wherein a mixture of m-xylene having a concentration of at least 98.5% and the methyl esters of toluic acids is used as the starting material.

6. In a process for producing esters of phthalic acids from mixtures of xylene and esters of toluic acids with monovalent alcohols having 1 to 4 carbon atoms, the steps which comprise oxidizing a mixture consisting of a xylene selected from the group consisting of p-xylene having a concentration of at least 98.5% and m-xylene having a concentration of at least 98.5% and esters of toluic acids with alkanols having 1 to 4 carbon atoms in the proportion by weight between about 1:3 and, at the most, 1:1 in the liquid phase with an oxygen-containing gas at a temperature between about 80° C. and about 250° C. in the presence of an oxidation catalyst for a prolonged period of time until the xylenes are substantially completely oxidized, and esterifying the resulting oxidate under pressure.

7. The process according to claim 6, wherein a mixture of p-xylene having a concentration of at least 98.5% and the methyl esters of toluic acids is used as the starting material.

8. The process according to claim 1, wherein a mixture of m-xylene having a concentration of at least 98.5% and the methyl esters of toluic acids is used as the starting material.

References Cited by the Examiner
FOREIGN PATENTS 557,345   5/1958   Canada.

LORRAINE A. WEINBERGER, *Primary Examiner.*

HERBERT J. LIDOFF, IRVING MARCUS, *Examiners.*